US012802481B2

(12) United States Patent
Batke et al.

(10) Patent No.: US 12,802,481 B2
(45) **Date of Patent: *Nov. 17, 2026**

(54) VIRTUAL ADVERSARIAL TRAINING FOR DOCUMENT INFORMATION EXTRACTION MODELS

(71) Applicant: SAP SE, Walldorf (DE)

(72) Inventors: Christoph Batke, Karlsruhe (DE); Sohyeong Kim, Berlin (DE)

(73) Assignee: SAP SE, Walldorf (DE)

( * ) Notice: Subject to any disclaimer, the term of this patent is extended or adjusted under 35 U.S.C. 154(b) by 293 days.

This patent is subject to a terminal disclaimer.

(21) Appl. No.: 18/477,770

(22) Filed: Sep. 29, 2023

(65) Prior Publication Data

US 2025/0111691 A1 Apr. 3, 2025

(51) Int. Cl.
*G06V 30/413* (2022.01)
*G06V 30/19* (2022.01)

(52) U.S. Cl.
CPC ...... *G06V 30/413* (2022.01); *G06V 30/19073* (2022.01); *G06V 30/1916* (2022.01); *G06V 30/19173* (2022.01)

(58) Field of Classification Search
CPC .......... G06N 3/08; G06N 3/084; G06N 3/088; G06V 30/413; G06V 30/1916; G06V 30/19073; G06V 30/19173; G06F 18/24
See application file for complete search history.

(56) References Cited

U.S. PATENT DOCUMENTS

| | | | |
|---|---|---|---|
| 10,885,385 B2 | 1/2021 | Kim et al. | |
| 10,963,645 B2 | 3/2021 | Reisswig et al. | |
| 11,003,861 B2 | 5/2021 | Reisswig et al. | |
| 11,803,758 B2 * | 10/2023 | Liu | G06V 10/7784 |
| 12,494,077 B1 | 12/2025 | Tang et al. | |
| 2020/0159828 A1 | 5/2020 | Reisswig et al. | |
| 2021/0142181 A1 * | 5/2021 | Liu | G06N 3/045 |
| 2021/0326751 A1 | 10/2021 | Liu et al. | |
| 2021/0374479 A1 | 12/2021 | Zambetti, Jr. et al. | |
| 2021/0374603 A1 | 12/2021 | Xia et al. | |
| 2022/0019849 A1 | 1/2022 | Kim et al. | |
| 2022/0067365 A1 | 3/2022 | Agrawal et al. | |

(Continued)

OTHER PUBLICATIONS

Extended European Search Report in European Appln. No. 24200648.4, mailed on Jan. 31, 2025, 8 pages.

(Continued)

*Primary Examiner* — Daniel G Mariam
(74) *Attorney, Agent, or Firm* — Fish & Richardson P.C.

(57) ABSTRACT

The present disclosure relates to computer-implemented methods, software, and systems for extracting information from documents based on training techniques to generate a document foundation model that is used to initialize a document information extraction model that is fine-tuned to business document specifics. A document information extraction model is initialized based on weights provided from a first pretrained model. Fine-tuning of the document information extraction model is performed based on labeled business documents as second training data. The labeled business documents are labeled and evaluated according to a virtual adversarial training (VAT). Based on the performed fine-tuning, a classifier for classification of information extraction is generated.

15 Claims, 8 Drawing Sheets

(56) References Cited

U.S. PATENT DOCUMENTS

| | | | | |
|---|---|---|---|---|
| 2022/0138572 | A1 | 5/2022 | Song et al. | |
| 2023/0075369 | A1 | 3/2023 | Kim et al. | |
| 2023/0376687 | A1 | 11/2023 | Morariu et al. | |
| 2024/0312233 | A1 * | 9/2024 | Kumar | G06V 30/18 |

OTHER PUBLICATIONS

Extended European Search Report in European Appln. No. 24201885.1, mailed on Jan. 31, 2025, 9 pages.
Greco et al., "Bringing order into the realm of transformer-based language models for artificial intelligence and law" Artificial Intelligence and Law 32.4, Dec. 2024, 83 pages.
Su et al., "Adversarial Learning for Supervised and Semi-supervised Relation Extraction in Biomedical Literature" CoRR, Submitted on Sep. 2020, arXiv:2005.04277v2, 8 pages.
Ba et al., "Layer normalization" CoRR, Submitted on Jul. 2016, arXiv:1607.06450v1, 14 pages.
Devlin et al., "BERT: Pre-training of Deep Bidirectional Transformers for Language Understanding" CoRR, Submitted on May 2019, arxiv:1810.04805v2, 16 pages.
Dodge et al., "Fine-tuning pretrained language models: Weight initializations, data orders, and early stopping" CoRR, Submitted on Feb. 2020, arXiv:2002.06305v1, 11 pages.
He et al., "Deberta: Decoding-enhanced bert with disentangled attention" CoRR, Submitted on Oct. 2021, arXiv:2006.03654v6, 23 pages.
Sadeq et al., "Informask: Unsupervised informative masking for language model pretraining" CoRR, Submitted on Oct. 2022, arXiv:2210.11771v1, 13 pages.
Sinha et al., "Masked language modeling and the distributional hypothesis: Order word matters pre-training for little" CoRR, Submitted on Sep. 2021, arXiv:2104.06644v2, 26 pages.
Vaswani et al., "Attention Is All You Need" CoRR, Submitted on Aug. 2023, arxiv:1706.03762v7, 15 pages.
U.S. Appl. No. 18/477,761, Batke, Self-Supervised Pretraining of Document Information Extraction Models with Informative Word Masking, filed Sep. 29, 2023, 46 pages.
Non-Final Office Action in U.S. Appl. No. 18/477,761, mailed on Jun. 26, 2026, 20 pages.
Sage et al., "Data-efficient information extraction from documents with pre-trained language models." International Conference on Document Analysis and Recognition. Cham: Springer International Publishing, Sep. 2021, 16 pages.
Wu et al., "Adversarial training for relation extraction." Proceedings of the 2017 conference on empirical methods in natural language processing, Sep. 2017, 6 pages.
Zhang et al., "Weighted sampling for masked language modeling." ICASSP 2023-2023 IEEE International Conference on Acoustics, Speech and Signal Processing (ICASSP). IEEE, Jun. 2023, 5 pages.

* cited by examiner

VIRTUAL ADVERSARIAL TRAINING FOR DOCUMENT INFORMATION EXTRACTION MODELS

TECHNICAL FIELD

The present disclosure relates to computer-implemented methods, software, and systems for data processing.

BACKGROUND

Information extraction approaches can be used in different natural language processing-based application. These approaches can be used to identify information and provide natural language understanding. The information extraction models can learn through a combination of pretraining, fine-tuning, and in-context learning. Pretraining is the initial phase of learning for models. During pretraining, models are exposed to a vast amount of unlabeled text data, where the pretraining aims at capturing the underlying patterns, structures, and semantic knowledge present in the text corpus. Fine-tuning is a process of further training a model on a specific task or in a specific domain. Fine-tuning can improve the performance of the model as pretrained on the specific task or domain to better fit the data.

SUMMARY

Implementations of the present disclosure are generally directed to a computer-implemented method for performing a selection of a predictive model from a set of candidate predictive models based on evaluation of deviation risk.

In one aspect, one example method may include operations such as obtaining first training data based on a plurality of unlabeled documents for use in training a first model for document information extraction; pretraining the first model according to a dynamic window adjustable to a word token count for each document of the plurality of unlabeled documents, wherein the pretraining comprises evaluating word tokens in each of the plurality of unlabeled documents where masking is applied according to individual masking rates determined for the word tokens, and wherein the individual masking rates are indicative of respective informative relevance of the word tokens; and providing the pretrained first model for initializing a second document information extraction model to be trained based on labeled documents as second training data.

In a second aspect, one example method may include operations such as pretraining a domain-specific neural network extraction model based on first training data, wherein the training data includes unlabeled documents, wherein the pretraining is performed based on informative word masking; performing fine-tuning of the pretrained domain-specific neural network extraction model based on labeled business documents as second training data, wherein the labeled business documents are processed according to virtual adversarial training (VAT) techniques; and based on the performed fine-tuning, generating a classifier associated with the domain-specific neural network extraction model.

In a third aspect, one example method may include operations such as initializing a second document information extraction model based on weights provided from a first model that is pretrained over training data including unlabeled business documents as first training data; performing fine-tuning of the second document information extraction model based on labeled business documents as second training data, wherein the labeled business documents are labeled and evaluated according to a virtual adversarial training (VAT); and based on the performed fine-tuning, generating a classifier for classification of information extraction.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description, drawings, and the claims.

DETAILED DESCRIPTION

Figure 1:
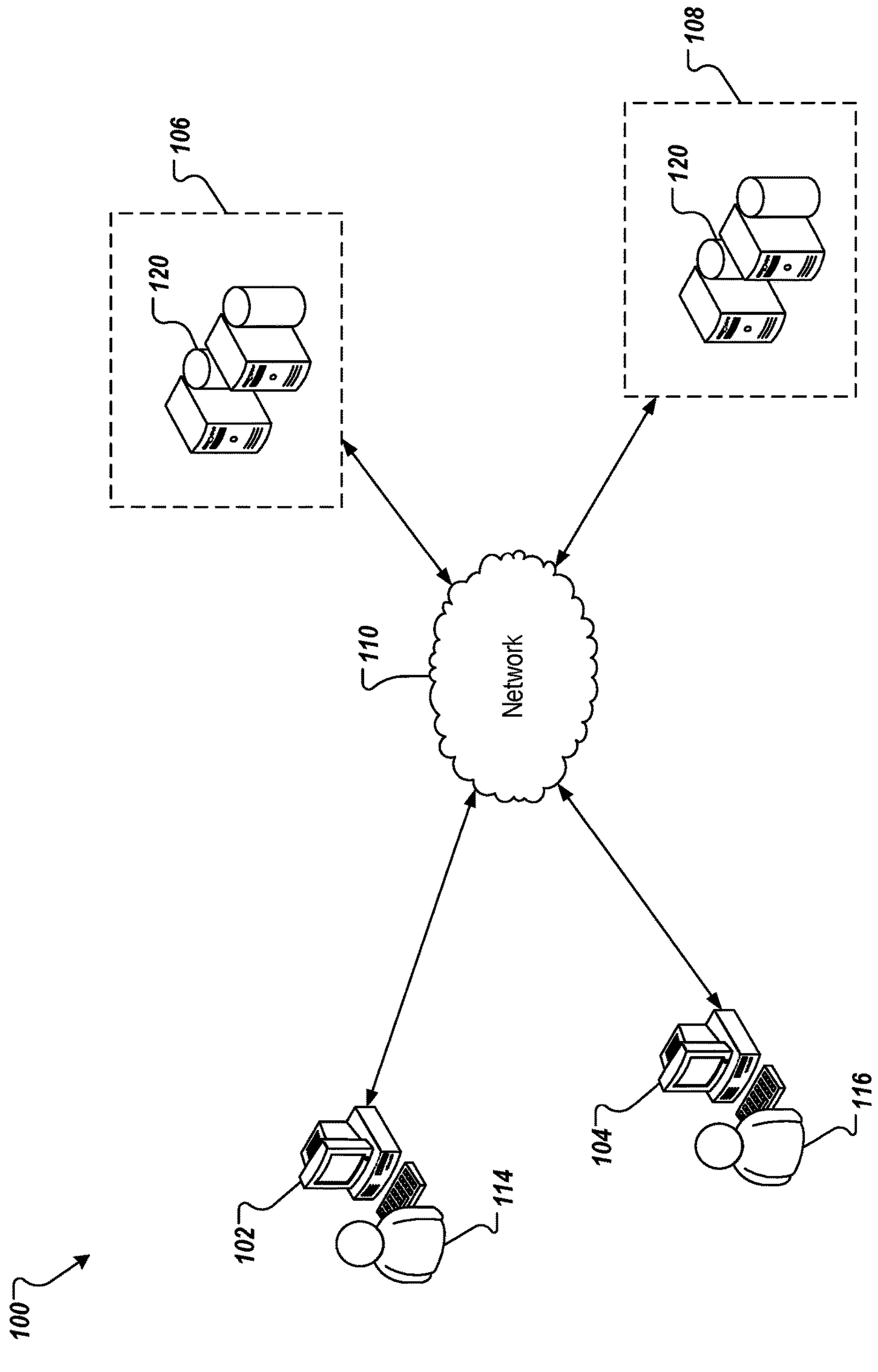
FIG. 1 is a block diagram depicting an example computer-implemented system that can execute implementations of the present disclosure in accordance with implementations of the present disclosure.

The present disclosure describes various tools and techniques for extracting information from business documents based on training techniques to generate a document foundation model by pretraining and fine-tuning that are tailored to business document specifics.

In some instances, web applications or service can provide services that extract information for logical entities identified in scanned documents, such as business documents. The logical entities in a business document can include header information and/or line-item information. For example, header information can include data such as a document date, a name (e.g., sender name), a sender bank account, sender tax ID, price amount, or total amount, among other entity-related data. The line-item information can be data provided in tables in a document, and that is included in fields. The line-item information can include line-item text (e.g., description of a product, product name, etc.), line-item quantity (e.g., units of a product), and/or line-item amount (e.g., price, number of products sold, etc.).

The business documents can be documents associated with a particular business task, such as an order, a purchase, a request, or other event or action. For example, information can be extracted from business documents, such as invoices, purchase orders, order confirmations, or payment advice, among others. In some instances, the extraction of information can be based on logic at a trained model that, when provided with a scanned business document, can automatically classify identified data from the document.

In some implementations, a machine-learning model can be trained to automatically extract information from business documents and provide the extracted information to end users or to other software applications or services (e.g., as input for initiation of another process or tasks). For example, if invoices are provided in scanned format to be used for preparing a tax declaration (e.g., by another application service or process), a document information extraction model can be trained to process the invoices based on the model and to provide the output from the processing to trigger a tax declaration generation process. Different configurations for using a trained model can be configured in a software system and/or application to provide documents as input and to obtain data as output that can be further used for input in other processes (e.g., to trigger initiation of a process at another system based on accumulated data from processed business documents).

In some implementations, a service that provides information extraction capabilities based on a trained model can be integrated into a software solution to convert business documents into database entries. In some implementations, the creation of such database entries can trigger business processes such as payment or other transaction execution.

Training a model for document information extraction can be associated with processing large volumes of documents that may have to be manually annotated to be used for the training. In some cases, the document annotation is a labor-intensive process, which can be associated with significant resources and time requirements, and the result can be error prone. In some instances, annotated datasets might not be available for every type of a business document. Thus, providing a trained model that can effectively process scanned documents that are domain-specific (e.g., business documents), can provide advantages for processing documents in a faster and reliable manner to obtain accurate results.

In some instances, a solution for training a model that relies on pretraining techniques applied on unlabeled documents that is also fine-tuned using smaller training set that is domain-specific and annotated is provided in accordance with implementations of the present disclosure. The pretraining techniques can include training based on masking techniques that mask words based on a probability rate determined for word tokens based on word token relevance to the text in the document. In such manner, the techniques allow training that is focused on words that have higher relevance to the text in the document, and the training process is optimized. The pretraining can be executed based on a dynamic window for evaluating the text in a document, so that the evaluation of document is adjustable to the size of each document, rather than fixed. By utilizing the dynamic window, the word distribution of the language corpus of the documents is modelled, and the masking during the training can be performed according to a determined informativeness of words in the documents, considering each document as a whole. The trained model can be fine-tuned by applying virtual adversarial training, where adversarial perturbations are applied to concatenated textual and spatial embeddings. The perturbations can be added to the input training data (e.g., as small noise) to be processed by the model and be used to train the model to still recognize and classify properly the input data.

FIG. 1 is a block diagram depicting an example computer-implemented system 100 that can execute implementations of the present disclosure in accordance with implementations of the present disclosure. In the depicted example, the example system 100 includes a client device 102, a client device 104, a network 110, a cloud environment 106, and a cloud environment 108. The cloud environment 106 may include one or more server devices and databases (for example, processors, memory). In the depicted example, a user 114 interacts with the client device 102, and a user 116 interacts with the client device 104.

In some examples, the client device 102 and/or the client device 104 can communicate with the cloud environment 106 and/or cloud environment 108 over the network 110. The client device 102 can include any appropriate type of computing device, for example, a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 110 can include a large computer network, such as a local area network (LAN), a wide area network (WAN), the Internet, a cellular network, a telephone network (for example, a public switched telephone network (PSTN)), or an appropriate combination thereof connecting any number of communication devices, mobile computing devices, fixed computing devices and server systems.

In some implementations, the cloud environment 106 includes at least one server and at least one data store 120. In the example of FIG. 1, the cloud environment 106 is intended to represent various forms of servers including, but not limited to, a web server, an application server, a proxy server, a network server, and/or a server pool. In general, server systems accept requests for application services and provide such services to any number of client devices (for example, the client device 102 over the network 110).

In accordance with implementations of the present disclosure, and as noted above, the cloud environment 106 can host applications and databases running on the host infrastructure. In some instances, the cloud environment 106 can include multiple cluster nodes that can represent physical or virtual machines that can represent web node clusters. A hosted application and/or service can run on VMs hosted on cloud infrastructure.

In some instances, the cloud environment 106 and/or the cloud environment 108 can provide infrastructure for execution of pretraining and adversarial training to classify documents as further described in relation to FIGS. 2, 3, 4, and 5.

In some instances, the cloud environment 106 and/or the cloud environment 108 can provide infrastructure to perform training of a document information extraction model in accordance with implementations of the present disclosure.

Figure 2:
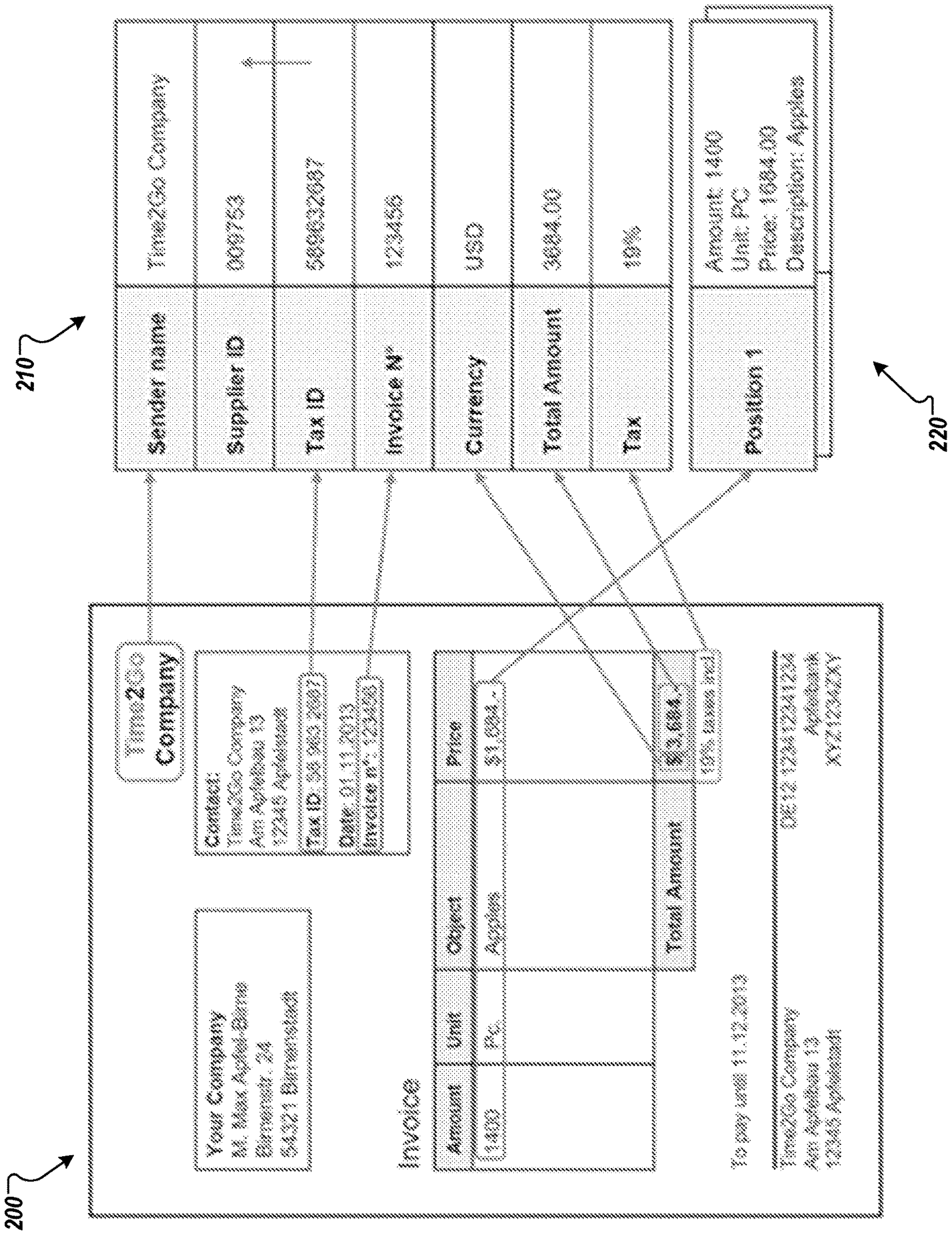
FIG. 2 is a block diagram depicting an example of a business document and extracted information from the business document that includes header information and line-item information.

FIG. 2 is a block diagram depicting an example of a business document 200 and corresponding extracted information from the business document, where the extracted information includes header information and line-item information.

The business document 200 is an invoice that includes information about a purchase of a product "Apples" of a certain amount for a certain price-here, 1400 pieces for a total price of $1,684. Other items of the invoice in the example document 200 are omitted from the representation of FIG. 2 for simplicity. When such document is provided as a scanned document, the text in the document can be recognized by using an Optical Character Recognition (OCR) application to obtain the text on the document together with the two-dimensional spatial information that identifies the location of the extracted text on the document.

In the example of FIG. 2, the document 200 is a business document including logical entities comprising header information and line-item information. In some instances, such information can be extracted from the document based on a trained model (e.g., neural network model trained with pretraining techniques and virtual adversarial training) in accordance with implementations of the present disclosure. The extracted information can be used to create entries in a database storage, or can be provided as input for storing in another application or system that may store the data according to a different data model.

The logic entities in business documents can include header information 210 and line-item information 220. The header information 210 includes information about the sender's name, the supplied ID, the tax ID, the invoice number, the currency of the invoice, the total amount of the invoice, and the applied tax. This information is positioned at word blocks on the business document and are spatially distant from one another. The line-item information 220 of the business document is information positioned in a row (single line) on the document, and includes the information about the subject of the invoice-here, purchase of apples. The line-item information 220 can be extracted from multiple fields on the same line identified at the invoice. In the example invoice 200, that is information for the amount of purchased apples at a particular price.

Figure 3:
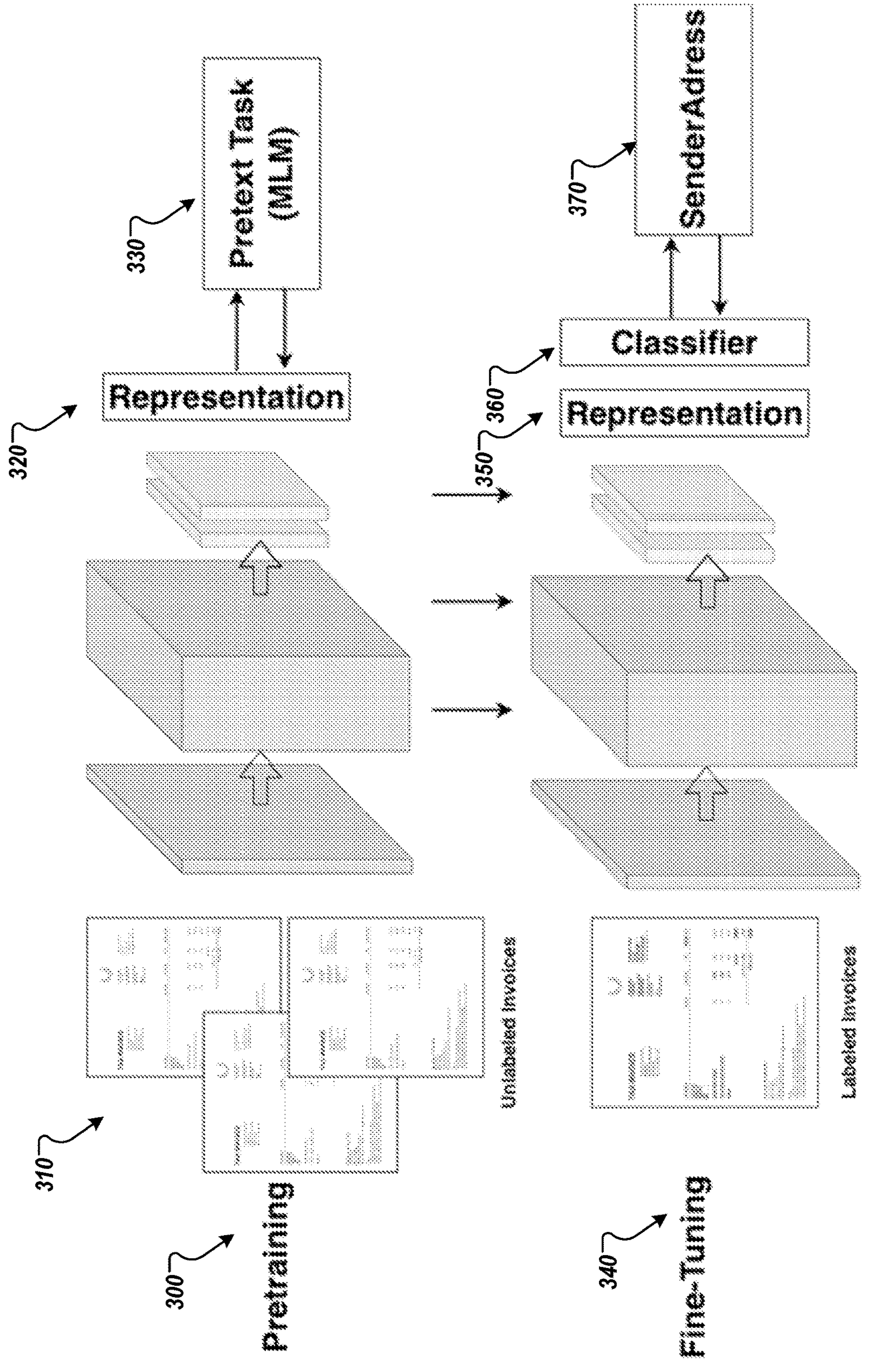
FIG. 3 is a block diagram presenting examples of processes for pretraining and fine-tuning a model for extraction of information from documents in accordance with implementations of the present disclosure.

FIG. 3 is a block diagram presenting examples of processes for pretraining 300 and fine-tuning 340 a model for extraction of information from business documents in accordance with implementations of the present disclosure.

In some instances, a model can be trained to classify data extracted from business documents by first performing pretraining based on unlabeled training data (i.e., a business document) to learn the structure of the data, where that pre-trained model can be fine-tuned using self-supervised learning techniques based on training data that is labeled and relies on a representation of the document as determined based on the pretraining.

During the pretraining stage (300), the model is trained on unlabeled business documents 310 as training data. The business documents can be processed for text recognition, as they can be scanned documents. The text recognition can be used to extract the text from each document, which is then used during the training. Based on the training, a representation 320 is learned by solving a pretext task 330 and by applying masked-language-modelling (MLM). The pretraining stage can be executed based on MLM techniques to enable bi-directional learning from text from the training data by masking, or hiding, a word or other defined portion of text in a document, and using other words on either side of the masked word (bi-directionally) to predict the masked word. The MLM techniques can be applied so that a certain percentage of words (that can be defined as text embeddings) in a document can be masked, and the model can predict those masked words based on the context of the business document.

In some instances, the pretext task 330 can be defined as a loss minimization problem to learn the pretrained model, where the problem is parameterized with θ based on considering the training business documents that are presented as sequences of word tokens and spatial tokens. The pretraining considers the sequence of spatial tokens $X^{M'}$ and word tokens $Y^{L'}$, as well as masked work tokens y and masked positions M'. The model can be presented as follows, and can be defined to minimize a cross-entropy loss function as presented below at formula (1):

$$L_{MLM}(\theta) = -\sum_{l=1}^{L'} \log p_\theta\left(y_l \mid X^{M'} Y^{L'}\right) \tag{1}$$

However, randomly masking tokens during pretraining as in MLM can have certain shortcomings. For example, some word tokens, if masked, can be too easy to predict; thus, including those as masked elements can lead to an inefficient loss determination during pretraining. Thus, masking of all words at the same rate without considering their informativeness in the context of the text (i.e., the contents of the scanned document) can reduce the usefulness for the final model's extraction accuracy. Further, if masking is applied randomly for a set of consecutive words, the training can be focused on interpretation of words based only on the surrounding words and neglecting the overall sequence representation.

In some implementations, to address the limitations of randomly masking tokens during pretraining, informativeness of words can be determined, and the masking can be applied based on an individual masking rate that corresponds to a metric defining a relevance of a given word. Thus, word tokens with higher masking rates can be masked more frequently during training compared to words with lower masking rates. The pretraining processes, which includes considerations of the informativeness of words and the whole size of a document as a sequence of tokens, are described in further detail in FIG. 4.

During fine-tuning 340, the representation 320 of the pretrained model is used for initialization of a representation 350 to be used for fine-tuning based on training using labeled documents as training data. By initializing the representation 350 at the fine-tuning 340 step with the representation 320, identification of informativeness of words withing a document as determined during the pretraining can be transferred to the fine-tuning stage, thereby supporting improved accuracy while also reducing resource expenditures by reducing training time and the computational resources for executing the data processing. Further, the representation 350 is initialized based on the structure identified for the document at the pretraining step 300 to maintain the architecture of the training execution to match the structure of training to generate a representation of the model-here, representation 320 and 350. The pretraining and the fine-tuning as described in the present disclosure can include substantially similar trainings steps with regard to the encoding steps but may differ in the decoding aspects. In some instances, during pretraining words are classified based on all the words in a vocabulary, while the fine-tuning classifies words based on predefined labels since the input is labelled (e.g., label of a sender for a invoice document as input). The input documents for training at the fine-tuning 340 stage are annotated or otherwise labeled, and the representation 350 is trained after being initialized according to virtual adversarial techniques to generate a fine-tuned representation. That fine-tuned representation can then be used to generate a classifier 360. The pretraining 300 allows generating the representation 320 and to input it into the training at the fine-tuning step 340, where the learning process is faster and yields accurate results for the classification in the specific domain of business documents, as the training is performed based on a training set that is of labeled training data. In some instances, the training data used for the fine-tuning 340 can be substantially smaller compared to the data used for the pretraining 300, which can improve the efficiency of the training execution.

Based on the generated classifier 360, when a new business document is provided, the generated classifier 360 can automatically identify categories in the document. For example, the classifier 360 could be used to automatically identify the sender address (370) from an invoice, such as from the invoice 200 of FIG. 2.

Figure 4:
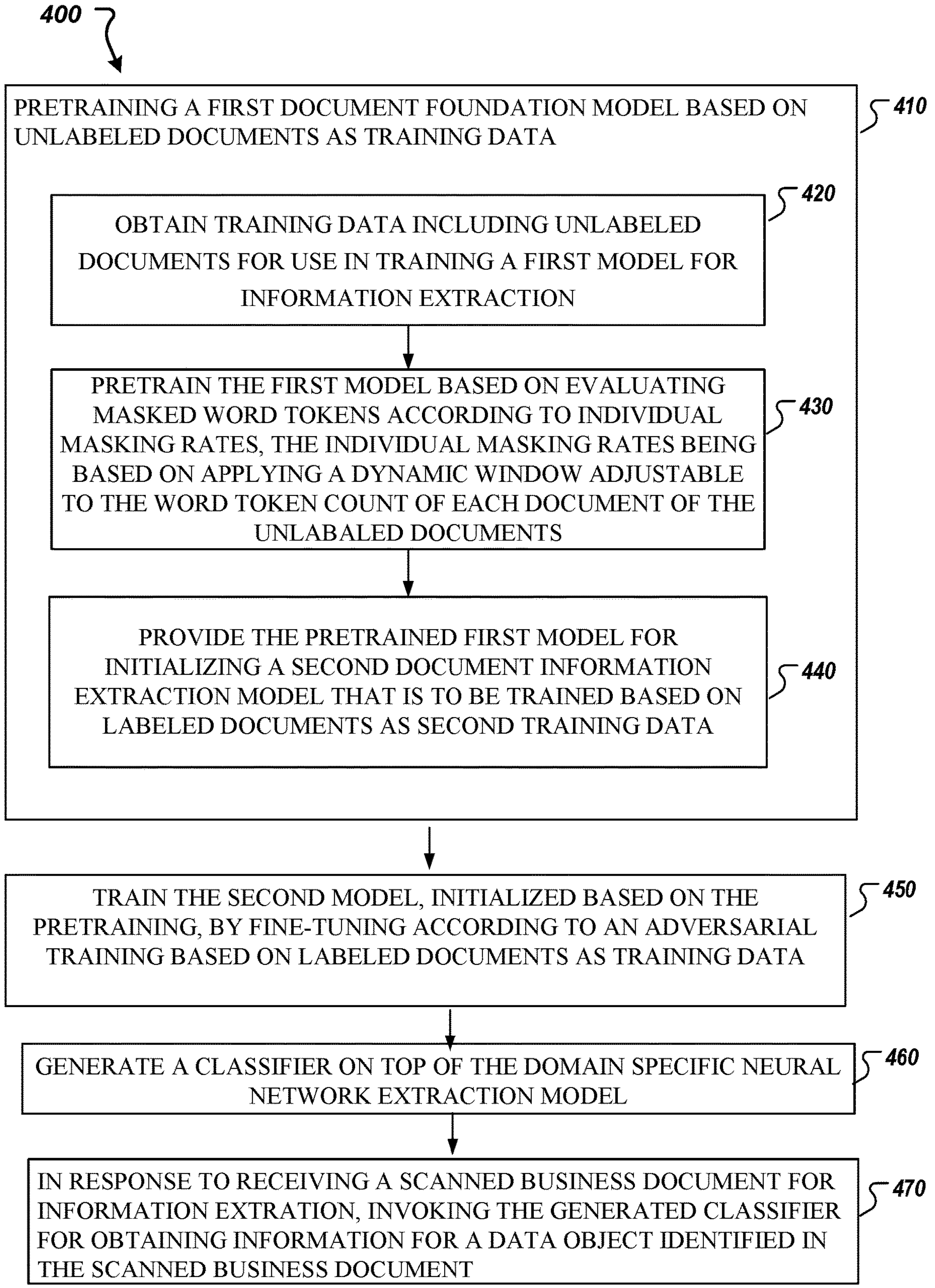
FIG. 4 is a flow diagram representing a process for training and executing a model to extract information from documents in accordance with implementations of the present disclosure.

FIG. 4 is a flow diagram of an example process 400 for self-supervised pretraining of a model based on informative word masking in accordance with implementations of the present disclosure. The pretraining can be performed as a pre-step to a training step used to generate a model, where the generated model is trained to perform information extraction from business documents as described, for example, in relation to FIG. 3. The subsequent training after the pretraining can be performed to fine-tune the model generated using labeled data specific to the context of the information extraction.

At 410, a first document foundation model is pretrained based on unlabeled documents (e.g., business documents or other scanned documents having a particular structure and header and line-item information) used as training data. The pretraining at 410 can be performed in a substantially similar way as the pretraining 300 of FIG. 3. In some instances, the pretraining 410 can be performed as a self-supervised training. Self-supervised pretraining can learn the common structure of the underlying training data by defining a pretext task that can produce a meaningful and descriptive representation of the unlabeled data. The pretext task is designed to generate labels for the unlabeled data.

The pretraining 410 includes obtaining (420) the training data including unlabeled business documents. For example, the obtaining 420 can be performed through uploading scanned documents at a storage space associated with the process execution. The obtained documents can be scanned documents that can be processed by an optical character recognition (OCR) process executed, for example, at an OCR engine. In some instances, the documents are obtained as scanned documents, and the text in the documents, together with two-dimensional spatial information identifying the location of the extracted text (words or numbers, or combination thereof), can be obtained. The spatial information for obtained text can identify locations of the text on the document. Business documents can have specific structure where data is provided at different locations and regions that can be aligned to one another to form the full representation of a page in a particular page format.

At 430, the pretraining is performed based on evaluating masked word tokens according to individual masking rates. The individual masking rates are determined based on applying a dynamic window adjustable to the word token count (occurrences) of each document of the unlabeled documents. The applied window is not a fixed window, and is adjustable to the length of the different documents in the training data. In some instances, a document can be a scanned page, where different documents can have different number of words that can be organized in a different way (with different spatial relationships) at their respective page.

In some instances, logical entities can be extracted from text (including text in images) and spatial text information as obtained from executing the OCR program. When scanned documents are obtained, text and spatial information can be extracted by applying rules defining rule-based extraction heuristics, neural network-based extraction models (e.g., DocumentReader, Chargrid, or Charmer) or post-processing logic such as sender address harmonization and matching. In response to obtaining the text and spatial information, that information can be persisted in a local storage, provided for use by users, or provided to an embedded solution to the data extraction service for further document processing.

The pretraining of the first document foundation model includes evaluating word tokens in each of the unlabeled business document where masking is applied according to individual masking rates determined for the word tokens. The masking rates can be calculated to reflect the informative relevance of words in a document, where those word tokens associated with a higher relevance can be masked more frequently than those word tokens associated with a lower relevance. As such, the individual masking rates are indicative of respective informative relevance of the word tokens.

In some instances, the pretraining includes determining the masking rates for word tokens. As discussed in relation to the pretraining 300 of FIG. 3, masking each word in a document with the same rate during training may be associated with shortcomings for the training execution (e.g., inefficiency in training), and can decrease the accuracy of the trained model as a result. Such shortcomings of random masking of tokens during pretraining can be overcome by considering informativeness of certain words, and applying masking rates to words based on such consideration of an informativeness metric.

In some instances, probabilities that words can occur together in a set window of words can be calculated. For example, a point-wise mutual information (PMI) metric can be calculated as a statistical measurement to determine the probability that two words occur together in a pre-defined window divided by the probability of those words ($w_1$ and $w_2$) occurring independently. The PMI metric can be calculated according to the below formula (2):

$$pmi(w_1, w_2) = \log\left(\frac{p(w_1, w_2)}{p(w_1)p(w_2)}\right) \tag{2}$$

In some implementations, the PMI metric as calculated according to formula (2) can be used to determine how "surprising" the co-occurrence of two words is in a sequence. The p ($w_1$, $w_2$) represents the probability that the two words occur together in the sequence., and the p($w_1$) or p($w_2$) represent the probability that the words occur in the sequence.

In some implementations, a measurement defining informative relevance of words in a sequence can be calculated based on the PMI metric. In some instances, the measurement of the informative relevance of words can be calculated by summing up the PMI scores, which are calculated for combinations between all masked and unmasked words in a sequence (e.g., all words in a document that form one page). In some instances, the PMI score can be calculated with a dynamic window size which corresponds to the length of a document page, and the PMI score can be used to define probabilities for masking word tokens during pretraining the document foundation model.

In some instances, when the first document foundation model is pre-trained, a sequence of word tokens that are used for the training can be defined according to a dynamic window that is adjustable to the different lengths of the different business documents used as training data for the pretrained first document foundation model. During the training, masking is applied, which is performed according to determined individual masking rates for each word token.

In some instances, a process for obtaining the individual masking rates for each word token can be deployed and executed to provide the rates as input for determining masking probability of words during the pretraining at 430. Based on such individual masking rates, the masking of some words can be reduced in comparison with others. In particular, masking probability of words that are less important to the information extraction task (e.g., words that are with a relatively lower measurement for informative relevance) can be reduced. For example, stop words can be considered as words of relatively less importance for providing informative relevance, and thus can be masked less frequently during training without negatively impacting the quality of the training to infer the labeling for word tokens.

In some implementations, the process for obtaining individual masking rates for each word in sequences of word tokens defined according to a dynamic window adjustable to the size of the training business documents can be calculated by following the steps including:

(i.) calculate a matrix with PMI scores for all words in a dataset including word tokens defined based on OCRed business documents as training data;

(ii.) mask, for each sequence of word tokens in a document, a certain portion (e.g., 15%) of the word tokens n times, where n corresponds to a number of sample sequences used during the training;

(iii.) calculate, for each masked sequence, an informative score by summing up the PMI scores calculated between all masked and unmasked words;

(iv.) rank the masked sequences according to their informative score in descending order;

(v.) take the most informative masked sequence (e.g., with the highest rank) and count the masked tokens; and (vi.) divide the masking counts through the token frequency in the dataset.

Based on the execution of the above steps, the result achieved at the last step can be used to assign individual masking rates for each of the word tokens. In some instances, to make the masking decision for each sequence, a sample number of sequences with different masked words can be taken when determining the most informative masked sequence. For example, n can be selected to be equal to 20 sample sequences, where the determined number of sample sequences can be determined with consideration of a computational cost of performing the ranking and determining the masking rates, while at the same time executing an algorithm that yields accurate results.

The PMI matrix as calculated at step (i.) accounts for the special word distribution in documents compared to natural language. Instead of having a fixed window to count the co-occurrences of two words on a sentence or paragraph level, a dynamic window is applied for the evaluation. The dynamic window is adjustable to the number of tokens on a current document page. With that, the word distribution of the document-specific language corpus (specific to business documents) is modelled, and the masking decision is adapted to the informativeness of words on the business documents. Having more informed masking decisions during the model pretraining leads to a higher accuracy of the extracted entities and improves the model convergence behavior. This can also lead to a shorter training time and less computational costs.

Using individual masking rates can support improved pretraining and a reduction of the number of processing times of masked sequences that include masking of words that do not have high informative relevance. Deploying such technique as a pre-processing step for training supports the masking during the training that can be executed faster and with fewer samplings. The masking for each word token do not have to have the same rate, but rather rely on the informative relevance of the words to optimize the determinations for the masking and the training as a whole, while yet achieving accurate training results in a cost-efficient manner without going through iterations through all the possible combinations of masks.

In some instances, by deploying such techniques of calculating masking rates, the masking probability of words that are less important to the information extraction task such as stop words is reduced. For example, experiments showed that although the word "limitation" has a high frequency, the masking rate for this word token is less than 10%, because it has no high relevance on the document level. On the other side, increasing the masking probability for words like "phone" may be a logical decision as these tokens are often associated with extracted document entities, such as the phone number of the buyer, and such entity is of high relevance on the document level.

Based on applying the MLM pretraining procedure at 430, the first document foundation model is trained to reduce the loss in determining a masked word token from an unlabeled document. The parameters of the learned first document foundation model are provided for initializing a second model at 440. The second model is a model for document information extraction that can be initialized and then trained based on labeled business documents as second training data.

At 450, a second document information extraction model is initialized based on the pretrained first document foundation model, and the second a first document foundation model is trained by fine-tuning according to adversarial training techniques. The adversarial training can be executed as described in relation to FIGS. 6 and 7.

At 460, based on the training, a classifier is generated on top of the second document information extraction model. In some instances, the second document information extraction model can be considered as a domain-specific neural network extraction model as it is relevant for the specifics of business documents that can have different structure and density of words on a document page.

At 470, in response to receiving a new scanned business document, the generated classifier can be invoked to extract the information from the new scanned business document and provide data about a data object identified in the document, such as, sender address from an invoice document.

In some instances, while the masking as explained above is determined on word token level, the masking can be performed to sub-word tokens. In some instances, masking that is performed on sub-word token level can be defined for specific type of entities in a document and may not be dependent on the type of the document as a whole. For example, sub-word tokens can help for special entities such as dates and time data or numbers (e.g., invoice number). The preprocessing steps to determining individual masking rates can be performed on sub-word level, and the masking rates for sub-words can be used for executing the training based on unlabeled business documents.

In some instances, the informative scores for sequences can be calculated when the word tokens are masked. In some instance, spatial information can be also considered. For example, spatial distance of the words can be used to determine informativeness of the words in the documents. For example, distance-based weights can be applied when performing the summing of the PMI scores at step (iii.) above. For example, the distance-based weights can be calculated based on any Minkowski distance such as Euclidean distance and Manhattan distance, or similar or derived distance measures. In some instances, posterior knowledge of word tokens into the informative score, such as if words have already been part of an extracted entity by a different extraction model, can also be considered in determining the masking scores. For example, key-value pairs can be defined and be assigned a higher informative score. In one example, a solution could assign key-value pairs, such as "Invoice #:" and "123234", with a higher informative score to informative scores of other word tokens that do not belong to predefined pairs. In some other examples, the informative score of predefined key-value pairs can be defined as a higher score by adding a predefined "add-up" value (e.g., a percentage or other value on a given scale).

Figure 5:
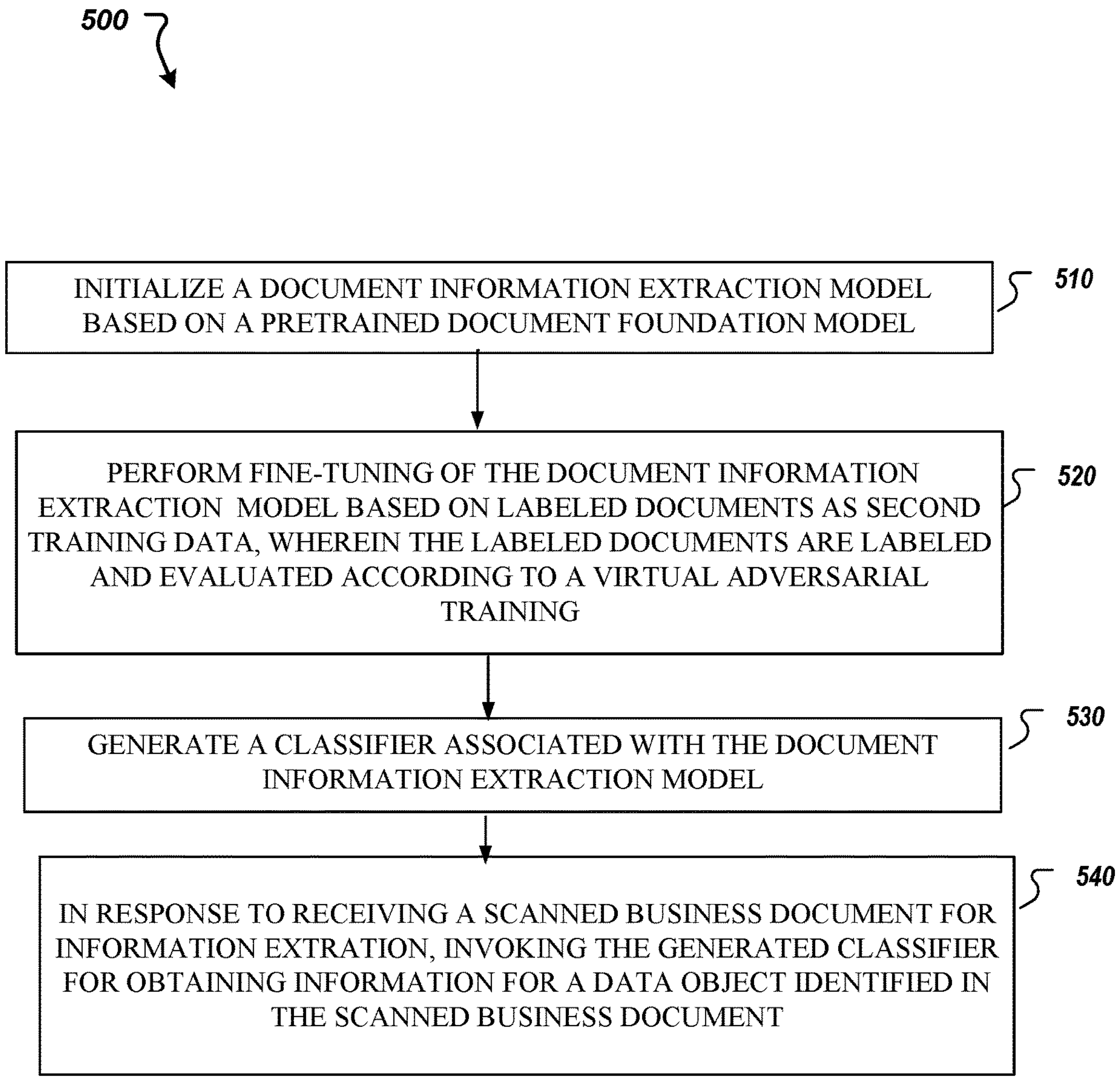
FIG. 5 is a flow diagram representing a process of fine-tuning a trained model based on virtual adversarial techniques to extract information from documents in accordance with implementations of the present disclosure.

FIG. 5 is a flow diagram representing a process 500 of fine-tuning a trained model based on virtual adversarial techniques to extract information from documents in accordance with implementations of the present disclosure.

At 510, a document information extraction model is initialized based on a pretrained model, for example, as described in relation to FIG. 4. The initializing can be based on weights provided from a first (pretrained) model that is pretrained over training data including unlabeled documents as first training data.

At 520, fine-tuning of the information extraction model is performed based on training according to labeled documents (e.g., business documents or other scanned documents having a particular structure and including header and line-item data) as second training data. The labeled business documents are labeled and evaluated according to a virtual adversarial training.

At 530, based on the performed fine-tuning, a classifier is generated on top of the second document information extraction model.

At 540, in response to receiving a scanned business document for information extraction, the generated classifier can be invoked to obtain information for a data object identified in the scanned business document. For example, a name and address of a sender of an invoice can be determined automatically.

Figure 6:
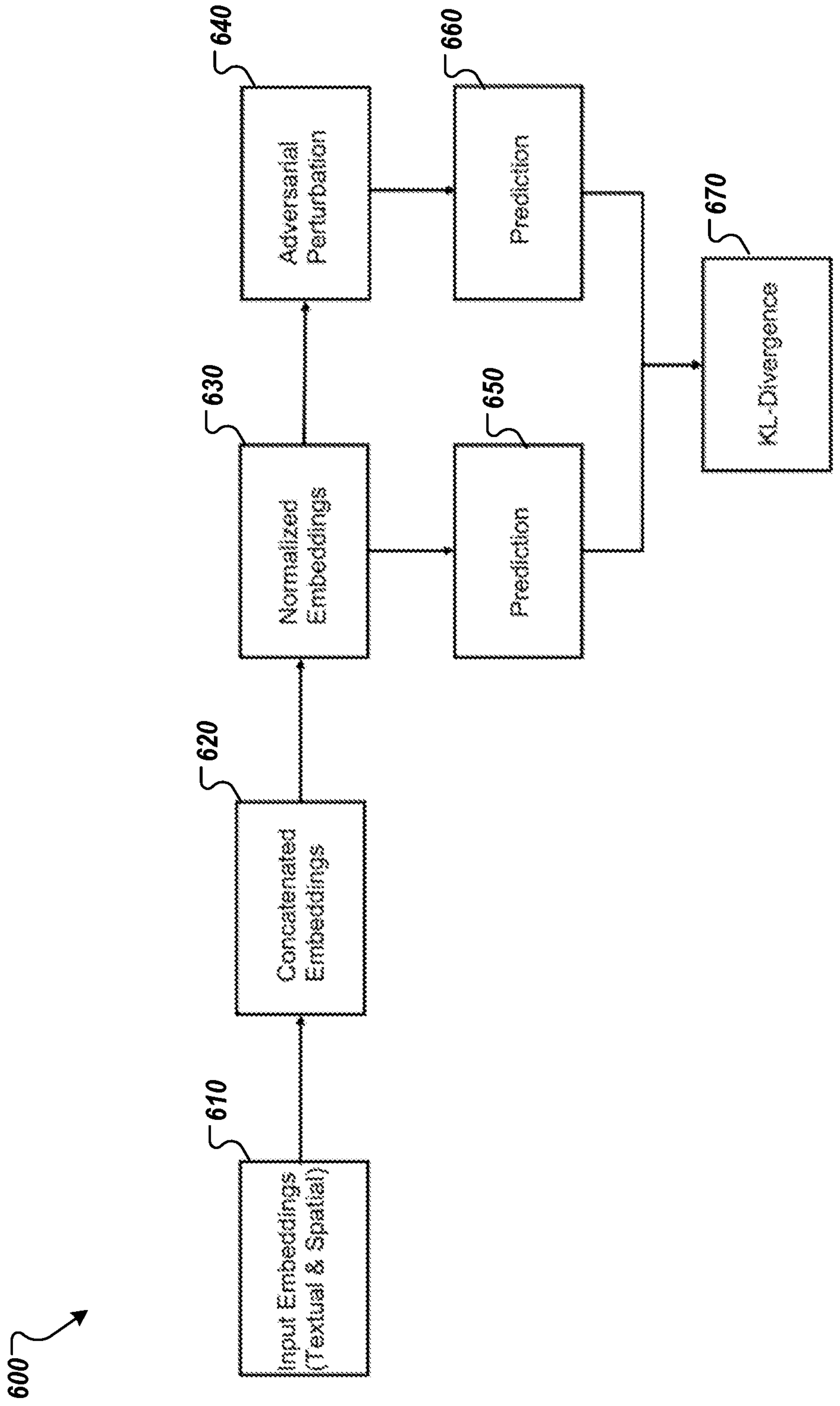
FIG. 6 is a block diagram representing steps applied on embeddings in the virtual adversarial training used to train a model for information extraction from business documents in accordance with implementations of the present disclosure.

FIG. 6 is a block diagram representing a process 600 for applying virtual adversarial training (VAT) to train a model for information extraction from business documents in accordance with implementations of the present disclosure.

In some instances, a pretrained model, such as a model provided by the pretraining as explained in relation to FIG. 3 and FIG. 4, can be fine-tuned, for example, as discussed in relation to the fine-tuning 340 of FIG. 3. The fine-tuning can be performed based on initializing a model according to parameters provided by a pretrained model, and then training the model based on labeled data and according to virtual adversarial techniques as described in the present disclosure.

In some instances, VAT can be applied in the context of training in the domain of business documents and based on input (used for initialization) from a pretrained model. The pretrained model can be trained over unlabeled data that is masked based on masking probabilities that correspond to informative relevance of the word tokens that are masked over dynamic windows. As such, the VAT can be applied in a more efficient way by initiating the training from a better-positioned starting point that accurately recognizes the structure of business documents. By applying VAT techniques, VAT aims at improving a model's robustness by adding small perturbations to the input to have the same output distribution between task-specific and adversarial examples.

In some instances, training data for the VAT can be obtained and input embeddings 610 can be defined for the input business documents that are labeled training data. The input embeddings can be defined to include textual (e.g., word tokens) and spatial embeddings. The textual and spatial embeddings with the tokens can be obtained from an OCR engine based on executed recognition over scanned documents provided as the labeled trained data. The textual and spatial embeddings are concatenated to provide concatenated embeddings 620 that are to be used during the training to generate predictions that can be compared to fine tune the model to perform accurate extraction of information from business documents. Layer normalization can be applied over these embeddings as concatenated to generate normalized embeddings 630. The concatenated embeddings 620 are also perturbed with a VAT objective, and the labels of the model trained for both the original and perturbated embeddings are predicted. Based on the normalized embeddings 630, a model prediction 650 is generated, and based on the adversarial perturbation 640, a model prediction 660 is generation. The predictions 650 and 660 are compared according to a Kullback-Leibler (KL) divergence 670. The KL divergence 670 can be used as a comparison measurement for the probability distributions of the two predictions (650 and 660) from the two models trained based on normalized embeddings 630 and adversarial perturbations 640.

In some instances, the adversarial perturbation 640 is computed by maximizing the KL divergence between the regular model output distribution q(y|x) and the adversarial output distribution p(y|x+r, θ) as in formula (3) below:

$$L_{adv}(x, \theta) = l_s[q(y \mid x), p(y \mid x + r, \theta)], \quad (3)$$

where y is the model output, x the model input, r the adversarial perturbation, and $l_s$ the symmetric version of the KL-divergence with two distributions P and Q, where:

$$l_s(P, Q) = D_{KL}(P\|Q) + D_{KL}(Q\|P) \tag{4}$$

Therefore, the perturbation is not a random or gaussian noise, but is computed to ensure that it is small enough not to change the inherent meaning of the input by maximining the KL divergence. In some instances, the noise that is added for the adversarial perturbation 640 can be directed towards regions of the model where the model is the most sensitive or uncertain to expose vulnerabilities during training. Compared to standard adversarial training, where the direction which deviates the most from the correct classification is selected, the process 600 applies VAT techniques that are independent of labels, hence only "virtually" adversarial.

In some instances, the outputs, as predictions from the adversarial example, are compared with the original input (just normalized) based on a KL-divergence metric that defined the VAT loss.

Figure 7:
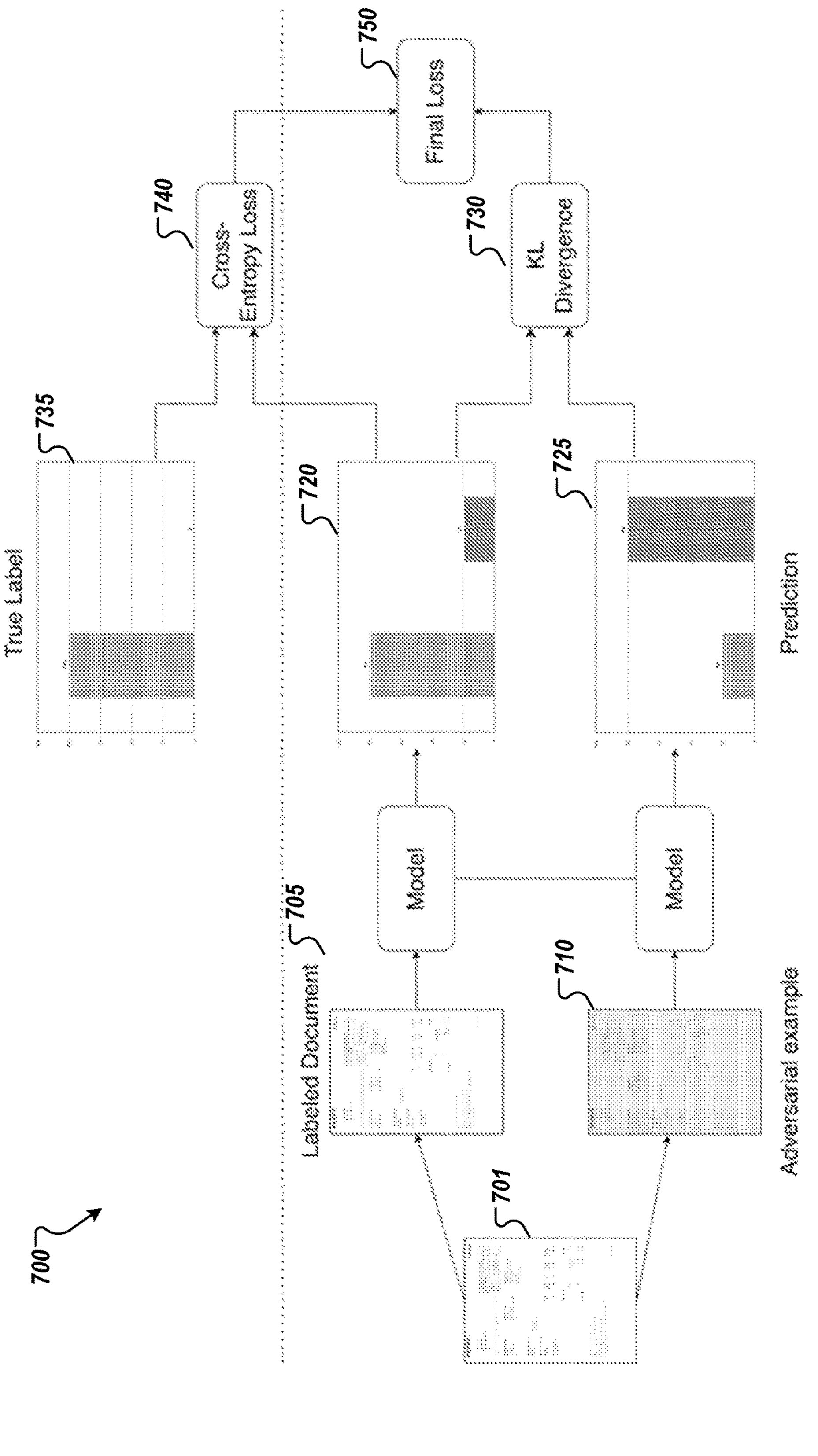
FIG. 7 is a block diagram representing a process of executing a virtual adversarial training in the context of business document information extraction in accordance with implementations of the present disclosure.

FIG. 7 is a block diagram representing a process 700 of executing a virtual adversarial training in the context of business document information extraction in accordance with implementations of the present disclosure. The process 700 can be executed in a VAT technique execution as described in relation to FIGS. 5 and 6.

The VAT technique relies on using labeled input business documents that are processed twice by the same model, such as a model that is initialized based on parameters provided from a pretraining process, for example, as described in relation to FIGS. 3 and 4. In some instances, the training labeled data can include a document 701 that is a business document and is associated with a labeled version (705) of the document 701 and an adversarial example 710 as a version of the document. In some instances, the obtained document 701 can be pre-labeled and obtained as the labeled document 705.

The processing of the labeled input documents, such as for document 705, is performed two times. First, the processing is based on text and spatial embeddings as extracted from the original business documents, and then, the processing is based on perturbated embeddings. Such processing corresponds to the processing of the labeled document 705 and the adversarial example 710 (with the perturbations). The adversarial training as shown at FIG. 7 include the process of providing adversarial examples as instances that are introduced to the document information extraction model and labeled as threatening as they are designed to cause that the model to make a wrong prediction. As such, the classification of the model is tested based on such adversarial examples and the performance of the model is evaluated to improve the predictive capacity of the model. An output distribution resulting from predictions from processing according to the input "as is" and the perturbated input can be presented as shown at 720 and 725 respectively. The distribution of the results, that is, correct classification and incorrect classification, can be compared, at 730, using the KL divergence as discussed in relation to FIG. 6. The comparison of the distributions can be a scalar number that can be treated as a new component for the training loss function in the context of the VAT training as a fine-tuning process for a pretrained model. Thus, the KL divergence 730 can be used together with a cross-entropy loss 740 to determine the final loss 750 from the execution of the processing. The cross-entropy loss 740 can be calculated as discussed in more detail in relation to FIG. 3 The cross-entropy loss 740 can be calculated as discussed in more detail in relation to FIG. 3 and based on true label data 735 and the data obtained from the training based on the labeled document 705.

In some instances, the obtained resulting scalar from the comparison (as an output from 730) can be added to a conventional cross-entropy loss (as determined at 740) to determine the final loss 750. The cross-entropy loss 740 can be determined from regular classification tasks based on the original input training data (including the document 705) as processed by the trained model to arrive at the result distributions at 720 and the true labeling for the input data (e.g., the document 705 as labeled).

Applying the VAT techniques can provide several benefits. The approach of fine-tuning a pre-trained model based on applying adversarial training is conceptually model-agnostic, i.e., it can be deployed to different neural network architecture and support robust and accurate results.

In some implementations, the perturbations that can be defined for the embeddings (e.g., textual embeddings) can be made entity-aware. In such manner, the perturbations can be designed to specifically target entities of the document such as names, dates or addresses by using predictions of an existing model(s). In some instances, constraints can be applied to the perturbations of those entities to avoid that the perturbations become invalid or nonsensical.

In accordance with the present invention, the VAT techniques are applied to the domain of two-dimensional (2D) document information extraction and adapts it to the task to identify labels for masked tokens based on processing of the original and adversarial output. To that end, adversarial perturbations are applied to the concatenation of the textual and spatial embeddings, thus, the perturbation is applied on the document representation. In some instances, the resulting fine-tuning performance can exceed the previous approach in terms of extraction accuracy and training stability.

Figure 8:
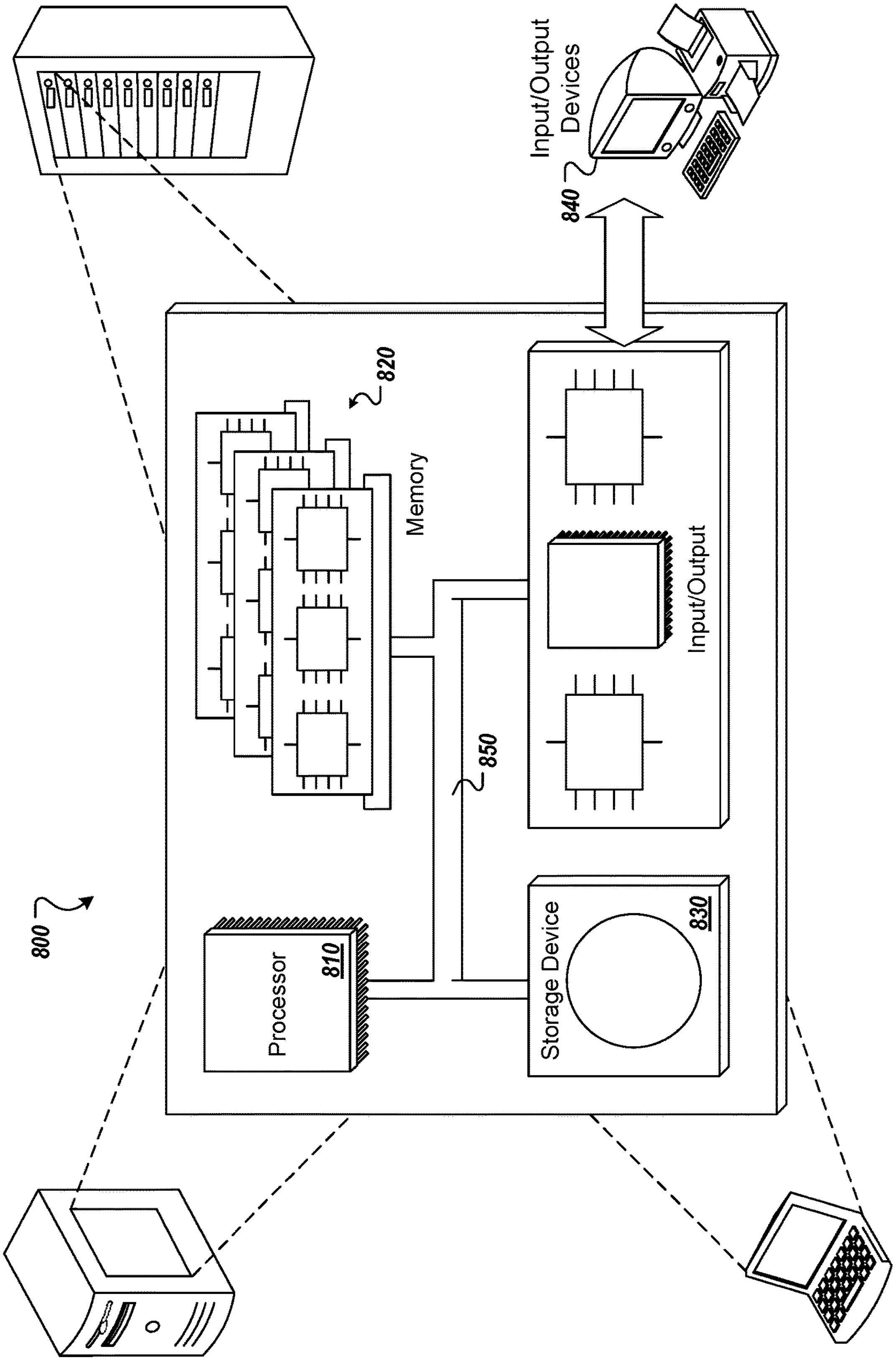
FIG. 8 is a schematic diagram of an example computer system that can be used to execute implementations of the present disclosure.

FIG. 8 is a schematic diagram of an example computer system 800 that can be used to execute implementations of the present disclosure. For example, the computer system 800 may be included in any or all of the server components discussed herein. The computer system 800 includes a processor 810, a memory 820, a storage device 830, and an input/output device 840. The components 810, 820, 830, and 840 are interconnected using a system bus 850. The processor 810 is capable of processing instructions for execution within the computer system 800. In some implementations, the processor 810 is a single-threaded processor. In some implementations, the processor 810 is a multi-threaded processor. The processor 810 is capable of processing instructions stored in the memory 820 or on the storage device 830 to display graphical information for a user interface on the input/output device 840.

The memory 820 stores information within the computer system 800. In some implementations, the memory 820 is a computer-readable medium. In some implementations, the memory 820 is a volatile memory unit. In some implementations, the memory 820 is a non-volatile memory unit. The storage device 830 is capable of providing mass storage for the system 800. In some implementations, the storage device 830 is a computer-readable medium. In some implementations, the storage device 830 may be a floppy disk device, a hard disk device, an optical disk device, or a tape device. The input/output device 840 provides input/output operations for the computer system 800. In some implementations, the input/output device 840 includes a keyboard and/or pointing device. In some implementations, the input/output device 840 includes a display unit for displaying graphical user interfaces.

The features described can be implemented in digital electronic circuitry, or in computer hardware, firmware, software, or combinations of them. The apparatus can be implemented in a computer program product tangibly embodied in an information carrier (for example, in a machine-readable storage device, for execution by a programmable processor), and method operations can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or another unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory, or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a cathode ray tube (CRT) or liquid crystal display (LCD) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship between client and server arises by virtue of computer programs running on the respective computers and having a client-server relationship with each other.

In addition, the logic flows depicted in the figures do not require the particular order shown, or sequential order, to achieve desirable results. In addition, other operations may be provided, or operations may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

In view of the above described implementations of subject matter, this application discloses the following list of examples, wherein one feature of an example in isolation or more than one feature of said example taken in combination and, optionally, in combination with one or more features of one or more further examples are further examples also falling within the disclosure of this application.

EXAMPLES

Although the present application is defined in the attached claims, it should be understood that the present invention can also be (alternatively) defined in accordance with the following examples:

Self-Supervised Pretraining of Document Information Extraction Models With Informative Word Masking Example 1. A computer-implemented method comprising:

obtaining first training data based on a plurality of unlabeled documents for use in training a first model for document information extraction;

pretraining the first model according to a dynamic window adjustable to a word token count for each document of the plurality of unlabeled documents, wherein the pretraining comprises evaluating word tokens in each of the plurality of unlabeled documents where masking is applied according to individual masking rates determined for the word tokens, and wherein the individual masking rates are indicative of respective informative relevance of the word tokens; and providing the pretrained first model for initializing a second document information extraction model to be trained based on labeled documents as second training data.

Example 2. The method of Example 1, wherein obtaining the training data includes performing an optical character recognition to determine words as part of at least some of the plurality of unlabeled document.

Example 3. The method of Example 1 or Example 2, wherein pretraining the first model comprises:

tokenizing each document of the plurality of unlabeled documents into a respective sequence of word tokens and spatial embeddings;

calculating the individual masking rates for the word tokens that identify the informative relevance of respective word tokens in the plurality of unlabeled documents; and learning a representation of the first model as a document foundation model, wherein the first model includes weights as parameters of the model defining strength of connection across different layers in the model.

Example 4. The method of claim 1, wherein the word tokens include at least one of single words or subwords.

Example 5. The method of any one of the preceding Examples, wherein the pretraining comprises:

defining sequences of word tokens for each of the plurality of unlabeled documents, wherein the sequences have different lengths corresponding to a count of the word tokens determined for each of the plurality of unlabeled documents after performing text recognition; and obtaining the individual masking rates for each word token in the sequences of word tokens.

Example 6. The method of Example 5, wherein the obtaining of the training data comprises performing text recognition over the plurality of unlabeled documents to obtain documents including recognized text portions, and wherein obtaining the individual masking rates comprises:

calculating a matrix with point-wise mutual information (PMI) scores for the word tokens in the training data;

masking, for each sequence of word tokens in a document, a certain portion of the word tokens, wherein each sequence is masked n times, and wherein n corresponds to a number of sample sequences used during the training;

calculating, for each masked sequence, an informative score by summing up the PMI scores calculated between all masked and unmasked words;

ranking the masked sequences according to the respective informative scores;

selecting a masked sequence that is associated with the highest informative score as a most informative masked sequence according to the ranking; and dividing the masking counts to respective word token's frequency in the training data.

Example 7. The method of any one of the preceding Examples, comprising:

training the second document information extraction model for document information extraction based on labeled documents, wherein the training comprises:

initializing the second document information extraction model based on input provided from pretrained first model.

Example 8. The method of any one of the preceding Examples, comprising:

executing adversarial training over the second document information extraction model that is initialized based on the pretrained first model.

Example 9. The method of any one of the preceding Examples, comprising:

initializing the second model based on weights provided from the first model as pretrained;

performing fine-tuning of the pretrained first model based on labeled business documents as second training data, wherein the labeled business documents are labeled and evaluated according to a virtual adversarial training (VAT); and based on the performed fine-tuning, generating a classifier on top of the second document information extraction model.

Example 10. The method of Example 9, wherein performing the fine-tuning comprises:

creating text and spatial embeddings from the labeled business documents, wherein the embeddings are created as tokens obtained after executing optical character recognition (OCR) over the labeled business documents;

concatenating the text and the spatial embeddings to form a document representation;

applying layer normalization over the concatenated text and spatial embeddings; and perturbing the concatenated text and spatial embeddings according to an objective of the VAT to predict labels for original and perturbated embeddings, wherein performing the VAT comprises:

processing each labeled document twice by the model, wherein the processing includes i) processing each document with perturbated concatenated embeddings and ii) processing each document without the concatenated embeddings without perturbations;

comparing distributions of documents with the concatenated embedding and distributions of the documents with the perturbated embeddings; and obtaining a result to be used as a component for a training loss value to be added to a cross-entropy loss calculated based on the second training data.

Example 11. A system comprising:

one or more processors; and one or more computer-readable memories coupled to the one or more processors and having instructions stored thereon that are executable by the one or more processors to perform any one of the methods of Examples 1 to 10.

Example 12. A non-transitory, computer-readable medium coupled to one or more processors and having instructions stored thereon which, when executed by the one or more processors, cause the one or more processors to perform the method of any one of Examples 1 to 10.

Virtual Adversarial Training for Document Information Extraction Models

Example 1. A computer-implemented method comprising:

pretraining a domain-specific neural network extraction model based on first training data, wherein the training data includes unlabeled documents, wherein the pretraining is performed based on informative word masking;

performing fine-tuning of the pretrained domain-specific neural network extraction model based on labeled business documents as second training data, wherein the labeled business documents are processed according to virtual adversarial training (VAT) techniques; and based on the performed fine-tuning, generating a classifier associated with the domain-specific neural network extraction model.

Example 2. A computer-implemented method comprising:

initializing a second document information extraction model based on weights provided from a first model that is pretrained over training data including unlabeled business documents as first training data;

performing fine-tuning of the second document information extraction model based on labeled business documents as second training data, wherein the labeled business documents are labeled and evaluated according to a virtual adversarial training (VAT); and based on the performed fine-tuning, generating a classifier for classification of information extraction.

Example 3. The method of Example 2, comprising:

in response to receiving a scanned business document for information extraction, invoking the generated classifier for obtaining information for a data object identified in the scanned business document.

Example 4. The method of Example 2 or Example 3, wherein performing the fine-tuning comprises:

creating text and spatial embeddings from the labeled business documents, wherein the embeddings are created as tokens obtained after executing optical character recognition (OCR) over the labeled business documents;

concatenating the text and the spatial embeddings to form a document representation;

applying layer normalization over the concatenated text and spatial embeddings;

perturbing the concatenated text and spatial embeddings according to an objective of the VAT to predict labels for original and perturbated embeddings.

Example 5. The method of Example 4, wherein performing the fine-tuning comprises:

processing each labeled document twice by the model, wherein the processing includes i) processing each document with perturbated concatenated embeddings and ii) processing each document without the concatenated embeddings without perturbations;

comparing distributions of documents with the concatenated embedding and distributions of the documents with the perturbated embeddings; and obtaining a result to be used as a component for a training loss value to be added to a cross-entropy loss calculated based on the second training data as original.

Example 6. The method of any one of the preceding Examples, wherein the pretraining is applied based on a dynamic window adjustable to word token size of each document of the unlabeled business document.

Example 7. The method of any one of the preceding Examples, wherein the pretraining comprises evaluating word tokens in each of the unlabeled business document where masking is applied according to individual masking rates determined for the word tokens.

Example 8. The method of Example 7, wherein the individual masking rates are indicative of respective informative relevance of the word tokens, and wherein the pretraining comprises:

defining sequences of word tokens for each of the unlabeled business documents, wherein the sequences have different length corresponding to a count of the word tokens determined for each of the unlabeled business documents after performing text recognition; and obtaining the individual masking rates for each word token in the sequences of word tokens.

Example 9. A system comprising:

one or more processors; and one or more computer-readable memories coupled to the one or more processors and having instructions stored thereon that are executable by the one or more processors to perform any one of the methods of Examples 1 to 8.

Example 10. A non-transitory, computer-readable medium coupled to one or more processors and having instructions stored thereon which, when executed by the one or more processors, cause the one or more processors to perform the method of any one of Examples 1 to 8.

What is claimed is:

1. A computer-implemented method comprising:

initializing a second document information extraction model based on weights provided by a first model that is pretrained over first training data including unlabeled business documents, wherein the first model is pretrained to evaluate word tokens in the unlabeled business documents according to dynamic windows adjustable to word token size of each document of the unlabeled business documents, wherein the first model evaluates the word tokens by applying masking according to an individual masking rate determined for the word tokens;

performing fine-tuning of the second document information extraction model based on labeled business documents as second training data, wherein the labeled business documents are labeled and evaluated according to a virtual adversarial training (VAT); and based on the performed fine-tuning, generating a classifier for classification of information extraction.

2. The method of claim 1, comprising:

in response to receiving a scanned business document for information extraction, invoking the generated classifier for obtaining information for a data object identified in the scanned business document.

3. The method of claim 1, wherein performing the fine-tuning comprises:

creating text and spatial embeddings from the labeled business documents, wherein the embeddings are created as tokens obtained after executing optical character recognition (OCR) over the labeled business documents;

concatenating the text and the spatial embeddings to form a document representation;

applying layer normalization over the concatenated text and spatial embeddings;

perturbing the concatenated text and spatial embeddings according to an objective of the VAT to predict labels for original and perturbated embeddings.

4. The method of claim 3, wherein performing the fine-tuning comprises:

processing each labeled document twice by the model, wherein the processing includes i) processing each document with perturbated concatenated embeddings and ii) processing each document without the concatenated embeddings without perturbations;

comparing distributions of documents with the concatenated embedding and distributions of the documents with the perturbated embeddings; and obtaining a result to be used as a component for a training loss value to be added to a cross-entropy loss calculated based on the second training data as original.

5. The method of claim 1, wherein the individual masking rates are indicative of respective informative relevance of the word tokens, and wherein the pretraining comprises:

defining sequences of word tokens for each of the unlabeled business documents, wherein the sequences have different length corresponding to a count of the word tokens determined for each of the unlabeled business documents after performing text recognition; and obtaining the individual masking rates for each word token in the sequences of word tokens.

6. A non-transitory, computer-readable medium coupled to one or more processors and having instructions stored thereon which, when executed by the one or more processors, cause the one or more processors to perform operations comprising:

initializing a second document information extraction model based on weights provided by a first model that is pretrained over first training data including unlabeled business documents, wherein the first model is pretrained to evaluate word tokens in the unlabeled business documents according to dynamic windows adjustable to word token size of each document of the unlabeled business documents, wherein the first model evaluates the word tokens by applying masking according to an individual masking rate determined for the word tokens;

performing fine-tuning of the second document information extraction model based on labeled business documents as second training data, wherein the labeled business documents are labeled and evaluated according to a virtual adversarial training (VAT); and based on the performed fine-tuning, generating a classifier for classification of information extraction.

7. The non-transitory, computer-readable medium of claim 6, comprising:

in response to receiving a scanned business document for information extraction, invoking the generated classifier for obtaining information for a data object identified in the scanned business document.

8. The non-transitory, computer-readable medium of claim 6, wherein performing the fine-tuning comprises:

creating text and spatial embeddings from the labeled business documents, wherein the embeddings are created as tokens obtained after executing optical character recognition (OCR) over the labeled business documents;

concatenating the text and the spatial embeddings to form a document representation;

applying layer normalization over the concatenated text and spatial embeddings;

perturbing the concatenated text and spatial embeddings according to an objective of the VAT to predict labels for original and perturbated embeddings.

9. The non-transitory, computer-readable medium of claim 8, wherein performing the fine-tuning comprises:

processing each labeled document twice by the model, wherein the processing includes i) processing each document with perturbated concatenated embeddings and ii) processing each document without the concatenated embeddings without perturbations;

comparing distributions of documents with the concatenated embedding and distributions of the documents with the perturbated embeddings; and obtaining a result to be used as a component for a training loss value to be added to a cross-entropy loss calculated based on the second training data as original.

10. The non-transitory, computer-readable medium of claim 6, wherein the individual masking rates are indicative of respective informative relevance of the word tokens, and wherein the pretraining comprises:

defining sequences of word tokens for each of the unlabeled business documents, wherein the sequences have different length corresponding to a count of the word tokens determined for each of the unlabeled business documents after performing text recognition; and obtaining the individual masking rates for each word token in the sequences of word tokens.

11. A computer-implemented system comprising:

one or more processors; and one or more computer-readable memories coupled to the one or more processors and having instructions stored thereon that are executable by the one or more processors to perform operations comprising:

initializing a second document information extraction model based on weights provided by a first model that is pretrained over first training data including unlabeled business documents, wherein the first model is pretrained to evaluate word tokens in the unlabeled business documents according to dynamic windows adjustable to word token size of each document of the unlabeled business documents, wherein the first model evaluates the word tokens by applying masking according to an individual masking rate determined for the word tokens;

performing fine-tuning of the second document information extraction model based on labeled business documents as second training data, wherein the labeled business documents are labeled and evaluated according to a virtual adversarial training (VAT); and based on the performed fine-tuning, generating a classifier for classification of information extraction.

12. The system of claim 11, wherein the one or more computer-readable memories coupled to the one or more processors have instructions stored thereon that are executable by the one or more processors to perform operations comprising:

in response to receiving a scanned business document for information extraction, invoking the generated classifier for obtaining information for a data object identified in the scanned business document.

13. The system of claim 11, wherein performing the fine-tuning comprises:

creating text and spatial embeddings from the labeled business documents, wherein the embeddings are created as tokens obtained after executing optical character recognition (OCR) over the labeled business documents;

concatenating the text and the spatial embeddings to form a document representation;

applying layer normalization over the concatenated text and spatial embeddings;

perturbing the concatenated text and spatial embeddings according to an objective of the VAT to predict labels for original and perturbated embeddings.

14. The system of claim 11, wherein performing the fine-tuning comprises:

processing each labeled document twice by the model, wherein the processing includes i) processing each document with perturbated concatenated embeddings and ii) processing each document without the concatenated embeddings without perturbations;

comparing distributions of documents with the concatenated embedding and distributions of the documents with the perturbated embeddings; and obtaining a result to be used as a component for a training loss value to be added to a cross-entropy loss calculated based on the second training data as original.

15. The system of claim 11, wherein the individual masking rates are indicative of respective informative relevance of the word tokens, and wherein the pretraining comprises:

defining sequences of word tokens for each of the unlabeled business documents, wherein the sequences have different length corresponding to a count of the word tokens determined for each of the unlabeled business documents after performing text recognition; and obtaining the individual masking rates for each word token in the sequences of word tokens.

* * * * *